Patented Nov. 7, 1950

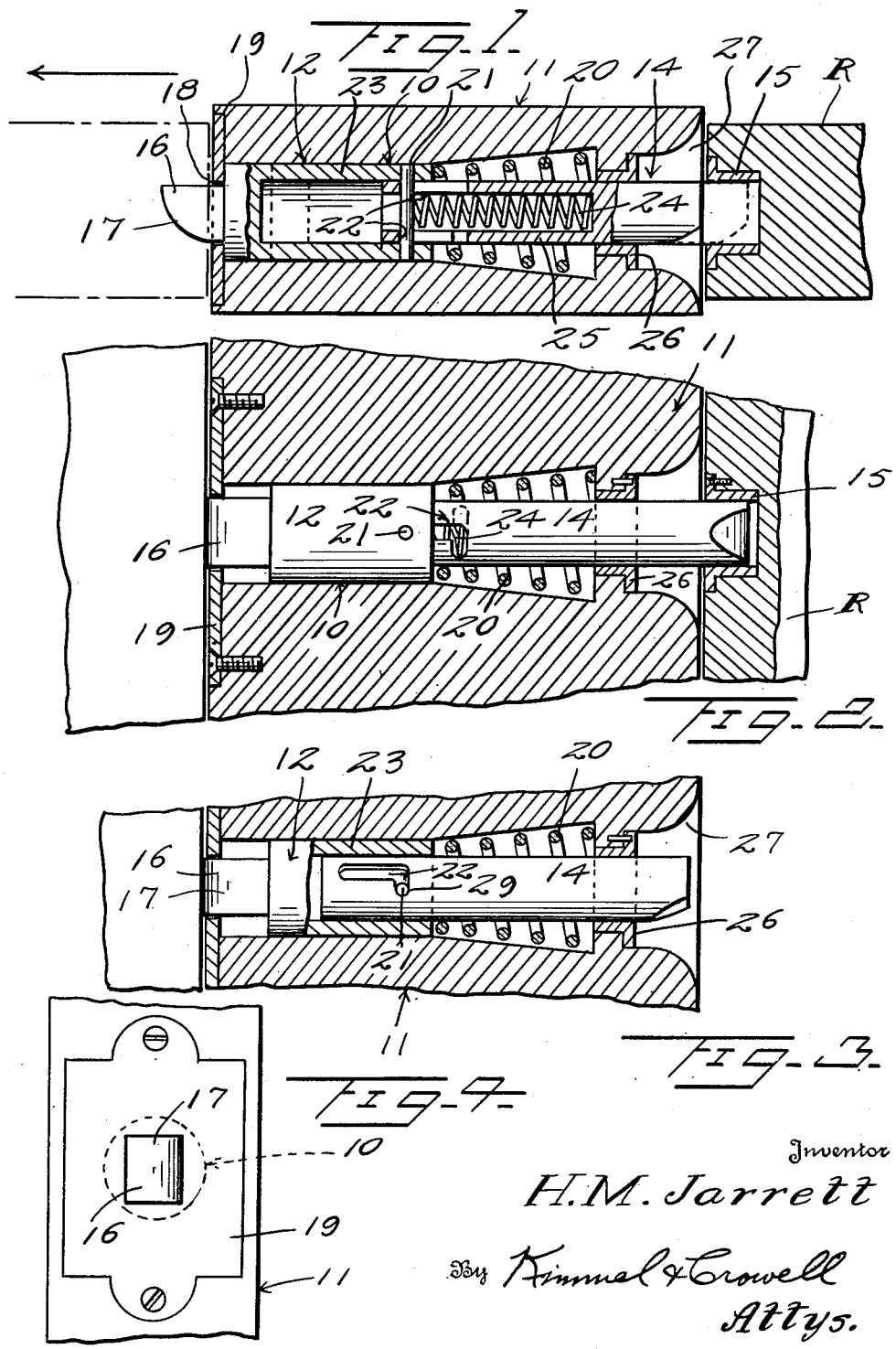

2,529,340

UNITED STATES PATENT OFFICE 2,529,340

SAFETY LATCH FOR AUTOMOBILE DOORS

Harry M. Jarrett, East Hartford, Conn.

Application August 3, 1948, Serial No. 42,159

5 Claims. (Cl. 292—182)

This invention relates to locks for automobile doors and more particularly to a supplementary lock for rear doors of automobiles.

It is an object of this invention to provide an extra or supplementary lock for rear doors of automobiles which depends for its operation on the positioning of the adjacent front door. The principal purpose of this invention is to provide a supplementary lock for the rear door of an automobile which will secure the rear door locked while the front door is closed so that the rear door will not be inadvertently opened by children or others in the rear of the car, and the opening of the rear door is dependent upon the opening of the front door. The lock also prevents the unauthorized opening of the rear doors from outside of the car when the front doors are closed.

Still another object of this invention is to provide a lock of this kind which may be added to automobiles presently in use as well as to automobiles in the process of manufacture. This lock is so formed and adapted to be installed with a minimum amount of labor, and requires very little rework of the present automobile structure for its incorporation.

A further object of this invention is to provide a lock of this kind which may be installed in position through only the necessary openings in the post between the front and rear doors which are required for its operation thus obviating the necessity of forming other holes to accomplish the installation or the dismantling of the wall.

With the use of a lock of this kind little or no attention is required from the driver to watch children in the rear seat as the door may not be opened when the doors beside the driver are closed. In order to permit a broader use of this lock, means are provided in the structure of the lock to render it inoperative so that the normal function and operation of the rear doors is permitted. As a safety measure the process for rendering the lock inoperative must be completed while the front and rear doors are open thereby preventing the inadvertent disposition of the lock in inoperative condition.

To the foregoing objects, and others which may hereinafter more fully appear, the invention consists of the novel construction, combination and arrangement of parts, as will be more specifically referred to and illustrated in the accompanying drawings, but it is to be understood that changes, variations, and modifications may be resorted to which fall within the scope of the invention as claimed.

In the drawings:

Figure 1 is a horizontal section through the safety lock constructed according to an embodiment of this invention;

Figure 2 is a vertical section;

Figure 3 is a vertical section showing the bolts in their retracted relative position; and Figure 4 is an end view of the lock secured in the post between the front and rear doors of an automobile.

Referring to the drawings, the numeral 10 designates generally an improved lock for locking the rear door of a four-door automobile when the front door is closed. The lock 10 is adapted to be secured or mounted within the post of the vehicle body fixed between the front and rear doors. In the structure of most automobile bodies, the front and rear doors are hingedly connected to the body at the front and rear ends thereof respectively. The free ends of the doors normally engage or abut the side edges of the vertical post fixed therebetween. The lock 10 of this invention is adapted to be mounted within this post 11 and slidable therein for engagement with the doors.

The lock 10 is formed of a pair of bolts 12 and 14 for engagement with the door. One of the bolts as the bolt 12 will be disposed within the post 11 for engagement with the front door F as shown in Figures 1, 2, and 3 of the drawing. The rear bolt 14 is adapted to be engaged within a keeper 15 carried by the free edge of the rear door R.

The front bolt 12 is substantially cylindrical in cross section and is tubular opening from the rear end thereof. A latch as 16 is fixed on the forward end of the bolt 12 being provided with a bevelled edge 17 for engagement with the free edge of the front door F. The latch 17 is adapted to be slidably engaged through an opening 18 in a plate 19 fixed on the forward side of the post 11. The bolt 12 is freely slidable within the post 11 and is biased to the extended position in relation to the post by a spring 20. A pin as 21 is fixed within the open end of the bolt 12 and is provided as a limiting means for the rearwardly extending bolt 14 to be described hereinafter. The bolt 12 is adapted to be supported in any suitable manner within the post 11 and as shown in the drawings is supported slidably within a wooden post formed with an opening or bore therethrough. The spring 20 is substantially frusto-conical in configuration having the divergent end thereof bearing against the free or open inner end of the front bolt 12. The other end of the spring 20 bears against the inner surface of the post 11 within the bore therethrough. The latch 16 is of a substantially reduced cross section relative to the tubular or cylindrical portion 21 of the bolt. The forward end of the tubular or body portion 21 is adapted to abut against the inner surface of the plate 19 within the post 11 for limiting the outward extension of the latch 16 relative to the post. In the extended position of the latch 16 it is adapted to be engaged by the rear edge of the front door F to be thereafter disposed in a retracted position relative to the post 11. In other words, when the door F is closed the latch 16 and bolt 12 are pressed into the post 11 against the tension of the spring 20 exerted thereon. When the door F is opened the latch 16 is free and the spring 20 presses the bolt 12 to its extended position relative to the post and the latch 16 will extend from the post and the plate 11 as shown in full lines in Figure 1 of the drawings.

The rear bolt 14 is slidably supported within the post 11 and is telescopically related to the forward bolt 12. The bolt 14 is slidably supported within the rear tubular section 21 of the bolt 12. The bolt 14 is also cylindrical in cross section having the rear portion thereof formed as a tube which is opened at the forward end thereof confronting the rearwardly opening tubular section 21 of the bolt 12. An elongated J-shaped slot 22 is formed in the tubular walls of the bolt 12 at the forward end thereof. The pin 21 carried by the bolt 12 slidably engages through the slot 22 for limiting the sliding movement of the bolt 14 within the rear tubular section of the bolt 12. A spring as 24 is disposed within the rearwardly opening tubular section 25 of the rear bolt 14. The forward end of the spring 24 bears against the pin 21 fixed on the bolt 12. The rear end of the spring 24 bears against the forward end of the tubular section of the bolt 14 for constantly pressing the bolt 14 rearwardly relative to the forward bolt 12. The rearwardly extending bolt 14 is slidably journaled within a cylindrical bearing member 26 fixed on the rear edge of the post 11. The bearing member 26 is disposed within a recess 27 in the post 11 for the purpose to be described hereinafter.

The rearwardly extending bolt 14 is positioned for normally being retracted within the post 11 when the forwardly extending bolt 12 is extended therefrom. When the bolt 12 is retracted within the post 11 by the closing of the front door F the rear bolt 14 is normally adapted to be extended from the post 11 for locking engagement with the rear door R. The J-slot 22 is disposed along the length of the rearwardly extending bolt 14 with its longer edge 28 disposed along the axis of the bolt and the shorter edge 29 disposed circumferentially about the tubular end of the bolt 14. The rear bolt 14 may be locked in a retracted position relative to the forward bolt 12 by engaging the circumferential portion 29 of the J-slot about the pin 21. The rear bolt 14 may be rotated to be locked in its retracted position by retracting the forward bolt 12 into the post 11 so that the rear end of the rear bolt 14 is extended from the post 11 and also extended relative to its bearing 26. The fingers of an operator may then be engaged with the bolt 14 for retracting it relative to the bolt 12 and rotating it a sufficient distance so that the pin 21 may be engaged within the portion 29 of the slot 22.

In the use and operation of the safety lock 10 the bolts 12 and 14 are normally disposed in their extended relative position. In this position when the front door F is closed the bolt 12 is retracted within the post 11 and the bolt 14 is extended rearwardly therefrom. Upon closing the rear door R the bolt 14 is engaged within the keeper 15 carried by the rear door and the rear door is thereby held against opening until the front door F has been opened permitting the bolt 12 to be extended from the post 11 and at the same time carrying with it the rear bolt 14 into a retracted position relative to the post 11. When it is desired to dispose the lock 10 in an inoperative position relative to the rear door the rearwardly extending bolt 14 may be locked in a retracted position relative to the bolt 12 and thereby held in a retracted position at all times relative to the post 11 irrespective of the relative position of the bolt 12 and the post 11.

What is claimed is:

1. A safety lock for automobile doors having a post between the front and rear doors comprising a pair of telescopically related bolt members slidable in said post and extensible from opposite sides thereof, spring means biasing said bolts to extended position, means limiting the sliding movement of one of said bolts relative to the other, and interengaging means including said means limiting the sliding movement of said one bolt carried by said pair of bolts adapted to selectively retain said pair of bolts in retracted inoperative position relative to each other.

2. A safety lock for the rear doors of automobiles having front and rear doors and a post therebetween comprising a pair of telescopic bolts slidable in said post, spring means pressing said bolts to extended position one relative to the other, spring means pressing one of said bolts for extension from said post for engagement with a front door, the other of said bolts being retracted in said post upon the extension of said one bolt therefrom and extended upon closing said front door, an interengaging means carried by said pair of bolts and adapted to retain said pair of bolts in retracted telescoped relation to each other.

3. A safety lock for the rear doors of automobiles having front and rear doors and a post therebetween comprising a pair of telescopic bolts slidable in said post, spring means pressing said bolts to extended position one relative to the other, spring means pressing one of said bolts for extension from said post for engagement with a front door, the other of said bolts being retracted in said post upon the extension of said one bolt therefrom and extended upon closing said front door, a counterbore formed in said post about said other bolt, and a pin carried by one of said bolts slidably engaging in a J-slot in the other bolt whereby said bolts may be locked in retracted position one relative to the other, said other bolt being thereby retracted in said post in all positions of said one bolt relative to said post.

4. An auxiliary lock for the rear door of an automobile having a post between the front and rear doors comprising a tubular bolt slidable in said post, spring means biasing said bolt forwardly relative to said post, a second tubular bolt slidable in said first bolt, and extensible from the opposite side of said post, spring means urging said second bolt rearwardly relative to said first bolt, means limiting the extension of said second bolt rearwardly relative to said first bolt whereby said second bolt will be spring pressed to retracted position relative to said post upon forward movement of said first bolt and spring pressed rearwardly upon rearward movement of said first bolt, and interengaging means including said means limiting the extension of said second bolt on said first and second bolts adapted to selectively lock said second bolt in retracted position relative to said first bolt.

5. A safety lock for the rear doors of automobiles having front and rear doors and a post therebetween comprising a bore extending through said post, a first tubular bolt slidable in said bore, a second bolt telescopically carried by said first bolt, spring means interposed between said bolts urging them into extended position, second spring means interposed between said post and said first bolt for urging the latter into forwardly projecting relationship to said post, a counter-bore formed in the rear edge of said post concentric with said bore, and interengaging means carried by said first and second bolts and adapted to lock said bolts in relatively retracted position.

HARRY M. JARRETT.

REFERENCES CITED

The following references are of record in the file of this patent:

UNITED STATES PATENTS

| Number | Name | Date |
|---|---|---|
| 1,724,759 | Gravel | Aug. 13, 1929 |
| 1,790,104 | Levitt et al. | Jan. 27, 1931 |
| 2,273,149 | Shannon et al. | Feb. 17, 1942 |

FOREIGN PATENTS

| Number | Country | Date |
|---|---|---|
| 411,966 | Great Britain | June 21, 1934 |